United States Patent Office 2,980,688
Patented Apr. 18, 1961

2,980,688

ACETYLATED ALDEHYDE ADDUCTS OF 2-AMINO-5-NITROTHIAZOLE

George Karmas, Bound Brook, N.J., assignor to Ortho Pharmaceutical Corporation, a corporation of New Jersey No Drawing. Filed Dec. 8, 1958, Ser. No. 778,578

6 Claims. (Cl. 260—306.8)

This invention relates to new organic compounds. More particularly, it relates to acetyl derivatives of aldehyde adducts of 2-amino-5-nitrothiazole having the formula

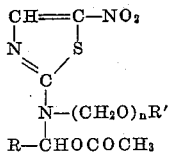

in which R is a substituent selected from the group consisting of hydrogen, methyl, ethyl and phenyl radicals, R' is selected from the group consisting of acetyl and methyl radicals and $n$ is a whole number smaller than 2.

The compounds of this invention are useful as anti-fungal and anti-protozoan agents. More particularly, the compounds claimed are effective against *Histomonas meleagridis, Trichomonas vaginalis, Trichomonas foetus* and *Candida albicans. Histomonas meleagridis* is the protozoan organism responsible for one of the most destructive diseases in turkey husbandry, enterohepatitis, often referred to as "blackhead."

*Trichomonas foetus* causes abortion in cattle. The compounds of this invention are useful in veterinary medicine.

It is an object of the present invention to provide novel compounds effective against protozoal infections.

Another object of this invention is to produce acetyl derivatives of the aldehyde adducts of 2-amino-5-nitrothiazole.

The new compounds are prepared according to the following general reaction scheme.

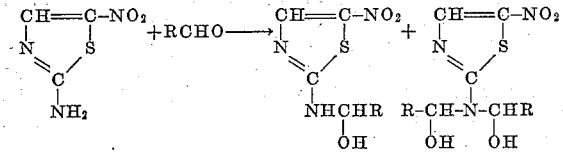

wherein R represents a hydrogen, methyl, ethyl or phenyl group. The compounds of the present invention are prepared by stirring a mixture of 2-amino-5-nitrothaizole with an excess of the aldehyde at about 20° C., to 90° C. Under these conditions, the adduct is formed in about five hours at room temperature; at higher temperatures, less than one hour may be sufficient. The reaction mixture containing the adduct is allowed to stand at low temperatures (about 0° C.) to cause crystallization of the product. The crystalline product may be isolated by filtration and air dried.

When an excess of aqueous formaldehyde is present, a high yield of the di-methylol adduct is obtained. A mixture of the mono- and di-methylol adduct is formed if the amount of formaldehyde is reduced.

With alkyl aldehydes such as acetaldehyde and propionaldehyde, the product is a mono-adduct accompanied by small amounts of the di-adducts.

With an aryl aldehyde such as benzaldehyde, 2-amino-5-nitrothiazole reacts less readily than with formaldehyde and the reaction product is a mixture of the starting thiazole and the mono-adduct.

It is a disadvantage of the aldehyde adducts of 2-amino-5-nitrothiazole that they slowly evolve aldehyde. The methylol group may be esterified to give stable acyl derivatives. Acetic anhydride in pyridine or an acid chloride is effective in esterifying the hydroxymethyl group.

The following examples are illustrative of the invention. All temperatures are expressed in degrees centigrade.

EXAMPLE I

2-[N-(acetoxymethyl)] acetamido-5-nitrothiazole

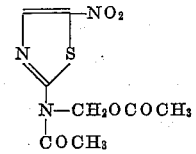

To a solution of 50 grams (0.345 mole) of 2-amino-5-nitrothiazole in 125 milliliters of dimethylformamide is added 40 milliliters (0.55 mole) of 37% aqueous formaldehyde. This mixture is kept at 25° for two days and then it is diluted to one liter with water and stored at 5° for one day. The yellow solid is filtered off and dried in air. It weighs 52.3 grams and is presumed to be a mixture of 2-amino-5-nitrothiazole, 2-methylolamino-5-nitrothiazole, and 2-dimethylolamino-5-nitrothiazole. The entire product is added to a cold (10°) solution of 85 milliliters of acetic anhydride in 125 milliliters of pyridine. After two hours of standing in an ice bath, the acetylation mixture is kept at 25° for eighteen hours and then poured into 1500 grams of ice and water and stirred well to hydrolyze excess acetic anhydride. One liter of chloroform is added and the mixture is stirred to dissolve the tacky product. The chloroform-water mixture is filtered to remove 2-acetamido-5-nitrothiazole and the filtrate layers are separated. After washing with cold 2% hydrochloric acid followed by 3% sodium bicarbonate the chloroform solution is dried with magnesium sulfate and concentrated under vacuum. The residue is distilled at a pressure of 0.01 millimeter to give 33.5 grams of viscous oil which boils at 155–185°. This is twice recrystallized from one liter portions of carbon tetrachloride to give 17.0 grams (19.0%) of 2-[N-(acetoxymethyl)]acetamido-5-nitrothiazole, flat cream prisms of melting point 144–145°.

*Analysis.*—Calcd. for $C_8H_9N_3O_5S$: C, 37.02; H, 3.50; N, 16.20. Found: C, 37.17; H, 3.61; N, 16.23.

The carbon tetrachloride mother liquors contain a considerable amount of 2-[N,N-di-(α-acetoxymethyl)]-amino-5-nitrothiazole, but this is more easily prepared as described in Example II.

EXAMPLE II

2-[N,N-di(α-acetoxymethyl)]amino-5-nitrothiazole

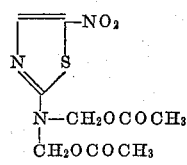

A suspension of 50 grams (0.345 mole) of 2-amino-5-nitrothiazole is vigorously stirred at 90° while 450 milliliters of 37% aqueous formaldehyde is added in one portion. This cools the reaction mixture to 70° and it is stirred at this temperature until all of the yellow solid dissolves. Then the yellow solution is cooled to 45° and filtered, and the filtrate is stored at 0° for three days to cause crystallization of the product. The product is filtered off and dried in air. The yield of 2-dimethylol-amino-5-nitrothiazole is 62.4 grams (88%); pale yellow prisms which melt at 120–125° (on a preheated block) with evolution of formaldehyde. To a suspension of 5.0 grams (0.0243 mole) of 2-dimethylolamino-5-nitrothiazole in 20 milliliters of acetic anhydride is added 0.5 milliliter of pyridine and the mixture is kept at 25° for four hours with occasional shaking. Then the mixture is poured into 300 grams of ice and water and stirred until hydrolysis of acetic anhydride is complete. The insoluble solid is filtered off and dried in air, and then boiled for four hours with 1500 milliliters of alcohol-free ether. After filtration, the ether solution is rapidly boiled down to a volume of 100 milliliters and stored at 0° to cause crystallization of 2-[N,N-di(α-acetoxymethyl)]-amino-5-nitrothiazole as pale yellow prisms having a melting point of 107–108°. The yield is 4.6 grams (65.3%), based on the 2-dimethylolamino-5-nitrothiazole.

*Analysis.*—Calcd. for $C_9H_{11}N_3O_6S$: C, 37.33; H, 3.83; N, 14.52. Found: C, 37.63; H, 3.89; N, 14.12.

EXAMPLE III

2-[N-(α-acetoxymethyl)]acetamino-5-nitrothiazole

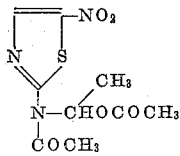

A mixture of 30 grams (0.207 mole) of 2-amino-5-nitrothiazole and 270 milliliters of freshly distilled acetaldehyde is stirred vigorously at 20° for three hours and then the resulting pasty mixture is stored at 10° for two hours. The mixture is filtered and the filter cake is washed with dry ethyl ether and then dried in air to give 24.5 grams (62.5%) of 2-(α-hydroxyethyl)amino-5-nitrothiazole as pale yellow prisms which melt at 110–115° (preheated block) with evolution of acetaldehyde. To a suspension of 10 grams (0.0528 mole) of 2-(α-hydroxyethyl)amino-5-nitrothiazole in 30 milliliters of acetic anhydride is added 20 milliliters of pyridine and the mixture is kept at 25° for six hours with occasional shaking. Then the mixture is poured into 300 grams of ice and water and stirred to hydrolyze acetic anhydride. The insoluble solid is filtered off and dried in air and then boiled for five hours with 1500 milliliters of ether. After cooling to 25° and filtering, the ether solution is boiled down to a volume of 250 milliliters and stored at 0° to cause crystallization of 2-[N-(α-acetoxyethyl)]acetamido-5-nitrothiazole as light orange clusters of melting point 135–137°. The yield is 8.2 grams (56.8%), based upon the 2-(α-hydroxyethyl)amino-5-nitrothiazole.

*Analysis.*—Calcd. for $C_9H_{11}N_3O_5S$: C, 39.52; H, 4.05. Found: C, 39.80; H, 4.20.

EXAMPLE IV

2-[N-(α-acetoxypropyl)]acetamido-5-nitrothiazole

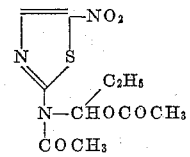

A mixture of 25 grams (0.172 mole) of 2-amino-5-nitrothiazole and 125 milliliters of freshly distilled propionaldehyde is stirred vigorously at 25° for five hours, and then stored at 0° for fourteen hours. Filtration of the paste and washing of the filter cake with ether followed by drying in air gives 27.5 grams (80%) of pale yellow granules of 2-(α-hydroxypropyl)-amino-5-nitrothiazole. This melts at 95–105° (preheated block) with evolution of propionaldehyde. A mixture of 5 grams (0.025 mole) of 2-[N(α-hydroxypropyl)]amino-5-nitrothiazole, 40 milliliters of acetic anhydride and 25 milliliters of pyridine is kept at 25° for five hours and then poured into 400 grams of ice and water. After stirring to hydrolyze the acetic anhydride, 150 milliliters of ether is added to dissolve the oily product, the mixture is filtered and then the ether portion is washed with cold 2% hydrochloric acid followed by aqueous sodium bicarbonate and dried with magnesium sulfate. The ether solution is concentrated to a tacky residue under vacuum. This is dissolved in 15 milliliters of warm ether and stored at 0° to give 4.0 grams (55.7% yield) of 2-[N-(α-acetoxypropyl)]acetamido-5-nitrothiazole as pale yellow heavy granules having a melting point of 85–87°.

*Analysis.*—Calcd. for $C_{10}H_{13}N_3O_5S$: C, 41.80; H, 4.56. Found: C, 41.99; H, 4.80.

EXAMPLE V

2-[N-(α-acetoxybenzyl)]acetamido-5-nitrothiazole

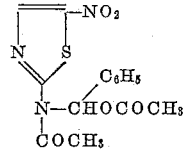

A mixture of 15 grams (0.1035 mole) of 2-amino-5-nitrothiazole and 110 milliliters of benzaldehyde is stirred and heated at 70–75° for thirty minutes and allowed to cool slowly to 25°. Then it is stirred vigorously and diluted with 400 milliliters of pentane and stored at 0° for twenty hours. After filtration, the yellow filter cake is returned to the reaction flask to which much of the tacky product has adhered. Forty milliliters of acetic anhydride and 80 milliliters of pyridine are added and the acetylation mixture is stirred at 10° for two hours and allowed to stand at 25° for twenty hours. The mixture is poured into 700 milliliters of ice and water and stirred to hydrolyze acetic anhydride, and then the solid is filtered off and dried under vacuum over phosphoric anhydride. The solid is refluxed with 500 milliliters of anhydrous ether for six hours and filtered while warm. The filtrate is rapidly boiled down to a volume of 200 milliliters and stored at 0° for two days to cause crystallization of 4.1 grams (11.8%) of 2-[N-(α-acetoxybenzyl)]acetamido-5-nitrothiazole as hard dense yellow granules which melt at 142–143°.

*Analysis.*—Calcd. for $C_{14}H_{13}N_3O_5S$: C, 50.16; H, 3.91. Found: C, 50.56; H, 3.99.

The in vitro trichomonadicidal activity of the esterified aldehyde adducts of 2-amino-5-nitrothiazole has been demonstrated by a series of tests which established the minimal inhibitory concentration of these compounds. Minimal inhibitory concentration, as used above, is defined as the minimal concentration of a trichomonadicidal compound capable of preventing the growth of, as well as the killing of *Trichomonas foetus* organisms introduced into a culture medium, capable alone of supporting a vigorous growth of the organisms, and containing the trichomonadicidal compound to be tested.

In making the test to determine minimal inhibitory concentrations, a glucose tryptone agar growth medium is prepared and 10 cubic centimeters of this growth medium is added to Petri dishes containing increasing amounts of the compound to be tested. The series of Petri dishes are sterilized and each dish is inoculated by streaking with a suspension of *Trichomonas foetus*. After inoculation, the series of Petri dishes are incubated for 72 hours at 32° and examined for growth. The minimal inhibitory concentration of the compound to be tested is that concentration in the Petri dish in which no viable organisms are observed after 72 hours. If growth is visible upon the surface of the glucose tryptone agar medium at the time of examination, the concentration of the esterified aldehyde adduct in that Petri dish is less than minimal. The results of these tests appear in columns 1 and 2 of Table I and the concentration of the esterified aldehyde adduct in the glucose tryptone agar medium is expressed in parts per million.

Table I

| | Trichomonas foetus In vitro | | Trichomonas foetus In vivo; mouse | |
|---|---|---|---|---|
| | Parts per Million | | mgm./kg. | Therapeutic Index |
| | Active | Inactive | $LD_{50}$ | $PD_{50}$ | |
| 2-[N-(Acetoxymethyl)]-acetamido-5-nitrothiazole | 4 | 2 | 1,665 | 115 | 14 |
| 2-[N,N-di(α-Acetoxymethyl)]amino-5-nitrothiazole | 2 | 1 | | | |
| 2-[N-(α-Acetoxyethyl)]-acetamido-5-nitrothiazole | 10 | 4 | >2,150 | 215 | 10 |
| 2-[N-(α-Acetoxypropyl)]-acetamido-5-nitrothiazole | 4 | 2 | >1,750 | 140 | 10+ |
| 2-[N-(α-Acetoxybenzyl)]-acetamido-5-nitrothiazole | 10 | 4 | >535 | 350 | 2 |
| 2-[N-(Acetoxymethyl)]-methylamino-5-nitrothiazole | 50 | 10 | >535 | <170 | 3+ |

The toxicity of the compounds of the present invention are determined by oral administration to mice and may be determined from the data appearing in column 3 of Table I. In column 3, under the heading $LD_{50}$ is indicated the quantity (in milligrams per kilogram of body weight) which is fatal to 50% of the mice tested. The amount (in milligrams per kilogram of body weight) required to cure 50% of the test animals injected with a lethal dose of Trichomonas foetus is indicated in column 3 under the heading $PD_{50}$. Column 4 of Table I reports the therapeutic index of these compounds.

In employing the trichomonadicides in the present invention for the treatment of Trichomonas foetus, one or more of the active agents are uniformly distributed in a suitable chemotherapeutic vehicle that is chemically compatible with the particular trichomonadicide selected, non-inhibiting with respect to the action of the effective agent upon Trichomonas foetus and essentially non-injurious to the vaginal mucosa under the conditions of use. The vehicle is preferably of a liquid or semi-liquid type. Furthermore, since the final preparation should be readily miscible with vaginal fluids, the vehicles, whether hydrous or anhydrous, are preferably water-miscible or water-dispersible. The compositions of this invention may be in the form of suppositories, if desired.

The foregoing criteria, for a vehicle in which the acetyl derivative of aldehyde adducts of 2-amino-5-nitrothiazole is incorporated, may be met by a large number of semi-liquid chemotherapeutic vehicles that are well known in the art. Thus, for example, the vehicle may comprise semi-liquids that are colloidal in nature, especially those that are viscous and/or mucilaginous in character. Such vehicles are particularly suitable for use in topical treatment of Trichomonas foetus because of their inherent gelatinous and miscible nature which affords prolonged contact between the active ingredient and the infecting organism.

In order to disclose more clearly the manner of formulating the compounds of the present invention to topical application, several specific examples will hereinafter be described in considerable detail.

EXAMPLE VI

| Deionized water | 75.80 |
| Sodium carboxymethylcellulose | 3.00 |
| Polyethyleneglycol (molecular weight approximately 4000) | 15.00 |
| Propylene glycol | 5.00 |
| p-Hydroxybenzoic acid methyl ester | 0.20 |
| 2-[N-(acetoxymethyl)]acetamido-5-nitrothiazole | 1.00 |

EXAMPLE VII

| Deionized water | 90.30 |
| Methylcellulose | 3.50 |
| Glycerin | 5.00 |
| p-Hydroxybenzoic acid methyl ester | 0.20 |
| 2-[N,N-di(α-acetoxymethyl)]amino-5-nitrothiazole | 1.00 |

EXAMPLE VIII

| Deionized water | 80.80 |
| Pectin | 8.00 |
| Propylene glycol | 10.00 |
| p-Hydroxybenzoic acid methyl ester | 0.10 |
| p-Hydroxybenzoic acid propyl ester | 0.10 |
| 2-[N-(α-acetoxyethyl)]acetamido-5-nitrothiazole | 1.00 |

The trichomonadicidal formulations of Examples VI through VIII are prepared according to the following general procedure in which two initial solutions are mixed to make the formulation, all the parts being given by weight. To prepare Solution A, dissolve the p-hydroxybenzoic acid in about two-thirds of the hot deionized water, cool to about 170° F., and, while stirring, add the gel-forming ingredient and glycerine or propylene glycol. To prepare Solution B, add the trichomonadicidal agent to the remainder of the deionized water. The pH is adjusted to the desired value. The formulation is prepared by adding Solution B to Solution A in a slow stream with good stirring; stirring is continued for at least one hour.

Compositions as described in Examples VI through VIII are preferably applied to the vagina by means of a vaginal applicator of sufficient length that the formulation may be placed evenly from the posterior fornix to the introitus.

The compounds of the present invention have also been found to be effective against enterohepatitis (blackhead) when administered by admixture, suspension, or dispersion in the food and/or drink normally partaken by turkeys, such as grain, mash, scratch, water or other liquids.

The general range of concentration of the aldehyde adduct in the total substance is from about 0.05% or less to about 1%. The optimal concentration for effective therapy is in the range from about 0.05% to about 0.2% of the total food or drinking water. With these optimal concentrations, the daily drug intake for infected birds varies from about 25 milligrams of drug per kilogram of body weight to about 400 milligrams of drug per kilogram of body weight. In general, the precise dosage depends on the particular compound and the severity of the infection. The compound, when administered in the concentrations indicated above, shows little toxic effects.

Various changes and modifications of the invention may be made and to the extent that such variations incorporate the spirit of this invention, they are intended to be included within the scope of the appended claims.

What is claimed is:
1. A compound having the formula

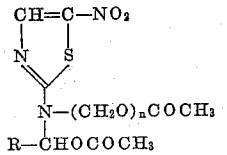

in which R is a substituent selected from the group consisting of hydrogen, methyl, and ethyl and n is a whole number smaller than 2.

2. A compound having the formula
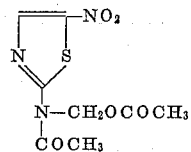
3. A compound having the formula
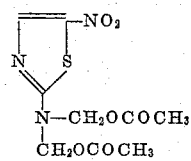
4. A compound having the formula
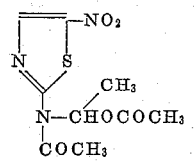
5. A compound having the formula
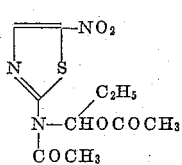
6. A compound having the formula
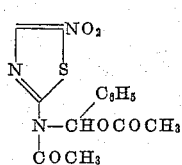
References Cited in the file of this patent
UNITED STATES PATENTS
2,915,526     Oroshnik _____ Dec. 1, 1959

UNITED STATES PATENT OFFICE
CERTIFICATION OF CORRECTION

Patent No. 2,980,688              April 18, 1961

George Karmas

It is hereby certified that error appears in the above numbered patent requiring correction and that the said Letters Patent should read as corrected below.

Column 3, line 25, for "-acetoxymethyl" read -- -acetoxyethyl --; column 4, lines 65 and 67, and column 5, line 7, for "medium", each occurrence, read -- media --; column 6, lines 66 to 72, the formula should appear as shown below instead of as in the patent:

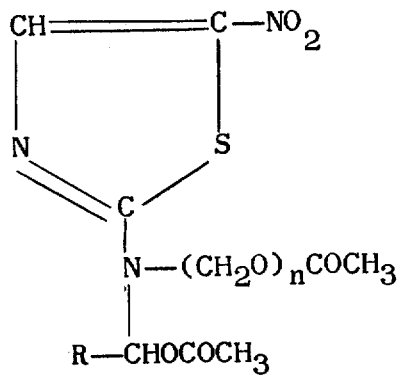

Signed and sealed this 3rd day of October 1961.

(SEAL)
Attest:

ERNEST W. SWIDER
Attesting Officer

DAVID L. LADD
Commissioner of Patents